June 6, 1939.  F. S. SMITH  2,161,103
CLOTH CUTTING MACHINE STANDARD PROTECTOR
Filed Sept. 27, 1938  2 Sheets-Sheet 1
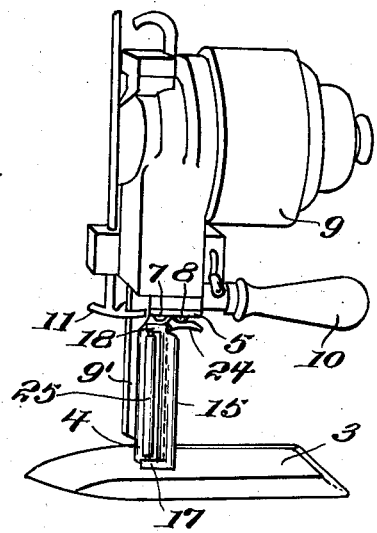
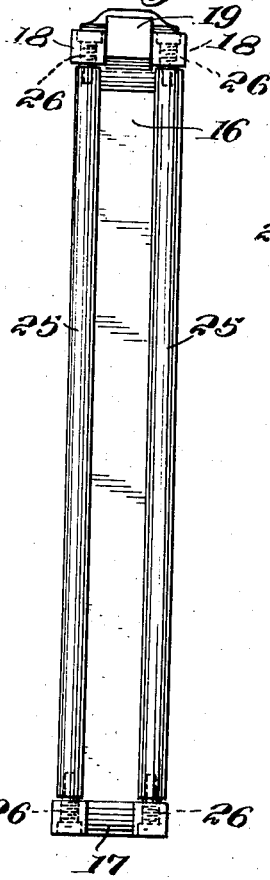
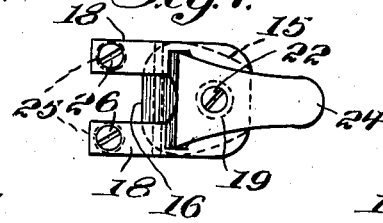
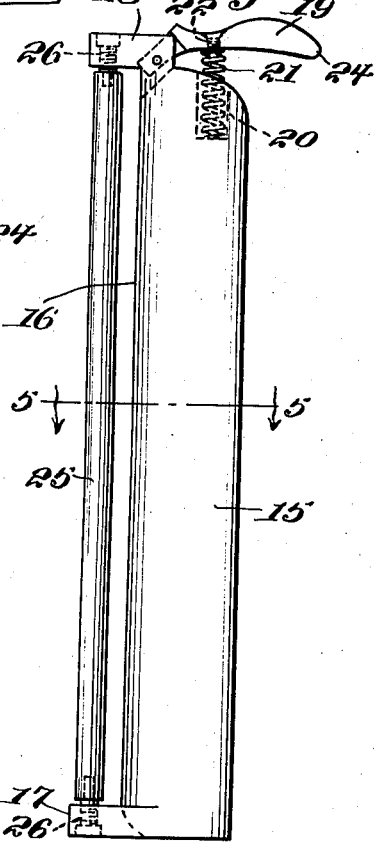
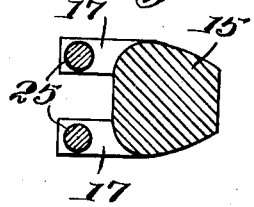
Francisco Sivila Smith
INVENTOR
BY Victor J. Evans & Co.
ATTORNEYS

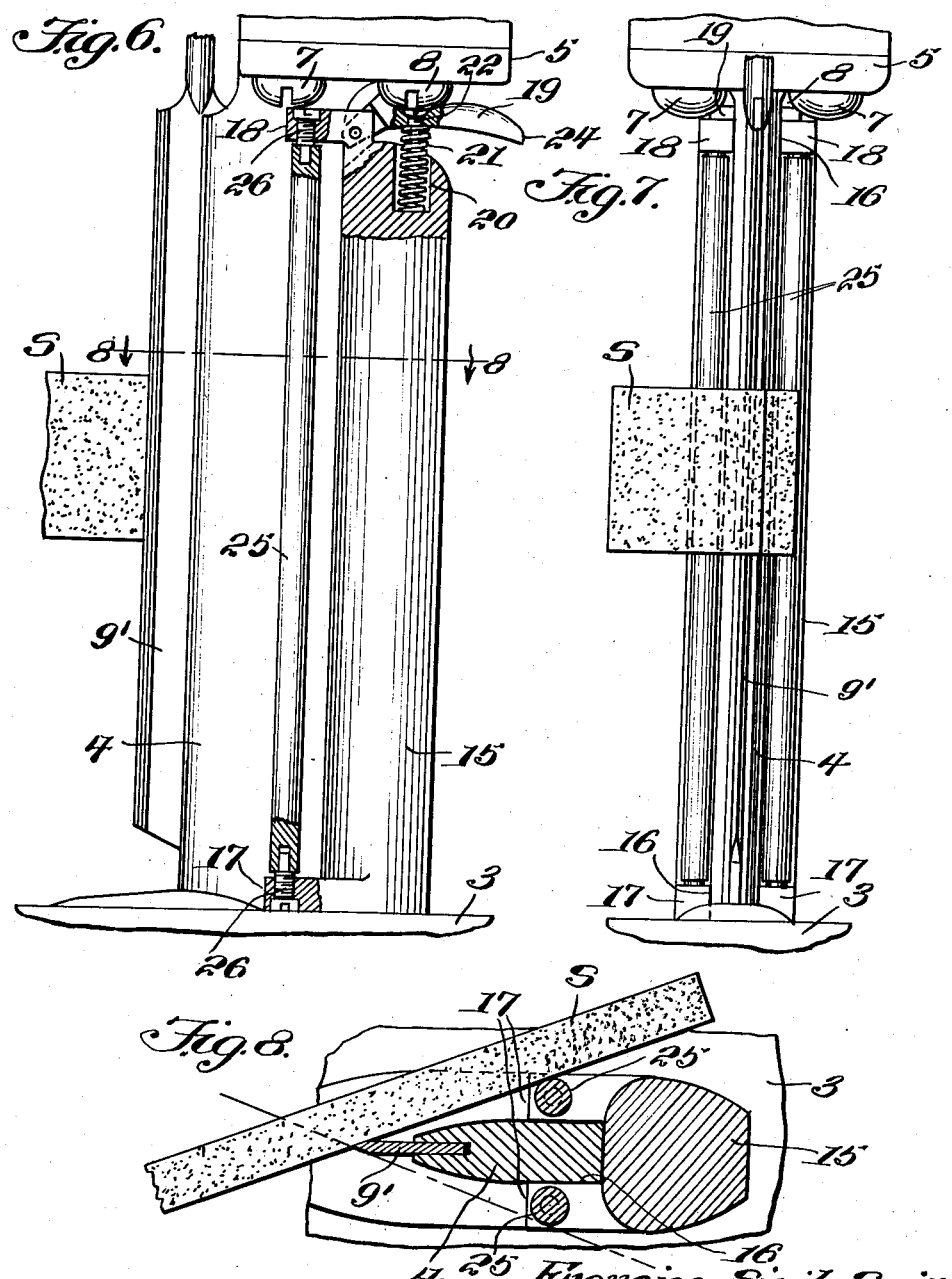

Patented June 6, 1939

2,161,103

UNITED STATES PATENT OFFICE 2,161,103

CLOTH CUTTING MACHINE STANDARD PROTECTOR

Francisco Sivila Smith, Mayaguez, P. R.

Application September 27, 1938, Serial No. 232,004

3 Claims. (Cl. 51—274)

My invention relates to cloth cutting machines of the type having a reciprocal cutting knife, and more particularly to an appliance especially designed for protecting the standard and the knife guard of these machines and for other purposes mentioned hereinafter.

Such cloth cutting machines are characterized by the provision of a flat base carrying a narrow upright standard which in turn carries a motor and other operating parts including a reciprocable cutting knife operated by the motor and slidable in a slotway in the standard. During the cutting operation the fabric or material to be cut in layers of various thickness is cut vertically by the reciprocating knife, the tapered side of the standard engaging the parted portion of the fabric and tending to slightly spread the same. Due to the high speed of the knife and the nature of the work, it is necessary to frequently sharpen the knife so that quick and accurate cutting may be performed. It is the practice to sharpen the knife without removing it from the machine, by employing an abrasive element in the form of an emery or carborundum stick, the operator standing in front of the machine, and making forward and downward strokes on each side of the knife. During this sharpening operation, the emery stick engages the side of the standard and in a comparatively short time the standard becomes roughened and worn, thus impairing the cutting operation and in the course of usage causes the standard to become so worn that it must be replaced by a new one.

In my invention I have aimed, primarily, to obviate these objections ensuing from the sharpening operation, by the provision of a new and useful appliance of simple and inexpensive construction, which will preclude any destroying effect upon the standard and will enable the knife to be sharpened at a more proper and accurate cutting angle.

Another object of my invention is to provide an appliance of the character described capable of being readily attached to and detached from the cutting machine and which is simple in construction, durable in use, efficient in operation and economical in manufacture.

Other objects and advantages will be apparent from the following description, appended claims and annexed drawings.

Referring to the drawings wherein like reference characters designate like parts throughout the several views:

Figure 1 is a perspective view of a cutting machine having my invention applied thereto.
Figure 2 is a front elevation of my invention.
Figure 3 is a side elevation thereof.
Figure 4 is a top plan view of my appliance.
Figure 5 is a sectional view taken on the line 5—5 of Figure 3.
Figure 6 is a side elevation of my invention partly in section illustrating the same in associated relation with the standard of a cloth cutting machine.
Figure 7 is a front elevation of Figure 6.
Figure 8 is a detail sectional view taken on the line 8—8 of Figure 6.

My new and useful appliance is well adapted for use with any cloth cutting machine of the vertical knife type, that is, in which a vertically reciprocating cutting knife is employed. For the purpose of illustration I have shown briefly in the drawings a conventional form of such a cloth cutting machine, which, as will be noted by reference to Figure 1, includes a flat base 3 to which is centrally and rigidly secured a narrow upright standard 4 formed on the upper end thereof with a flange 5 to which is secured by means of front and rear screws 7 and 8 respectively a motor 9 adapted to reciprocate through the agency of a housed connection (not shown) a cutting knife 9' which is guided at its rear edge in a slotway in the standard 4. In use the machine rests upon a cutting table and the operator grasping the handle 10 moves or slides the machine about upon the table so as to cut a lay of fabric or any material disposed between the base 3 and knife guard 11 according to any shape or design desired. It is to be understood that the knife is reciprocated at a very high speed during the cutting operation. It will be noted that the standard which of necessity must be comparatively narrow in order not to spread the parted portions of the cloth too much, is the sole means of support for the motor and operating parts, and therefore, rigidity of the standard is essential.

Because of the frequent need for sharpening the knife it is found most practical to employ an emery or carborundum stick (such as indicated diagrammatically by reference character S in Figure 4) as the abrasive element or tool. During the sharpening operation in which the operator stands in front of the machine and moves the emery stick in downward and forward strokes along the sides of the knife, the tool also bears against the sides of the standard, this being inevitable, because the tool must engage the knife at the proper angle. The wearing effect of the tool upon the standard soon so roughens the same as to impede the standard in its passage between the fabric, so that the cutting machine cannot be operated with the ease and facility that it should. Furthermore, during a comparatively short time with regard to the life of a machine of this character the standard will become so worn and cut away at its front and side edges as to render it an unstable means of support, consequently requiring the substitution of a new standard.

By means of the improvements which my invention provides the effects following the frequent sharpening of the cutting blade as mentioned are entirely avoided, and in addition, several distinct advantages are gained. My improvement consists in providing a protective device or guard adapted to be detachably secured to the standard so as to fully cover the sides of the same while exposing the blade for sharpening. Thus the cutting knife may be sharpened and there will be no destructive wear upon the standard as the same is wholly protected by the protective device or guard. This device in addition to serving as a protective means also forms a guide for the sharpening element in that by bearing the element against rotatable means on the guard the element will engage the knife at the proper angle so as to insure an even, accurate cutting edge.

By thus protecting the standard, the sides thereof will soon acquire a smooth and highly polished surface by contact with the fabric during the cutting operation, and as a consequence the cutting machine may be moved through the lays with increasing ease and facility and with greater accuracy and less effort on the part of the operator.

In furtherance of the foregoing I have provided as illustrated in the drawings a protective guard and sharpening guide comprising an elongated vertically extending member 15, the front face 16 thereof engaging the rear face of the standard 4 and said member is provided on the lower end thereof with a pair of spaced forwardly extending arms 17 having seating engagement with the upper face of the base 3 of the machine and which embraces the sides of said standard. The upper end of the member 15 is likewise formed with a pair of spaced forwardly extending arms 18 embracing the sides of the standard and between which is pivotally mounted one end of a lever 19.

The lever 19 is formed above said end with an arcuate shaped section for receiving between the ends thereof the rear screw 8 and which coacts with the upper faces of the arms 18 (which engage the screw 7) to support said member fixed between said flange 5 and base 3. The upper end of the member 15 is provided with a socket 20 in which is seated the lower end of a coil spring 21, the upper end engaging the under face of the lever 19 and normally urging said lever upwardly into engagement with the screw 8. A screw 22 is mounted in said lever and extends downwardly therethrough between the convolutions of the spring 21 whereby to maintain said spring against displacement relative to the lever 19. The opposite end of the lever is formed with a finger piece 24 whereby said lever may be actuated downwardly against the tension of the spring to detach the same from the screw 8 and permit removal of the device from the machine. The outer ends of the arms 17 and 18 are disposed laterally of the sides of the standard 4 and inwardly of the cutting edge of the knife 9 and have rotatably mounted therebetween vertically disposed rollers 25.

The ends of the rollers 25 have journaled therein the reduced ends of adjusting screws 26 mounted in the respective ends of the arms 17 and 18 as clearly illustrated in Figure 3 of the drawings.

From the foregoing it will be apparent that when the member 15 is inserted between the base 3 and flange 5, the rollers will be disposed on each side of the cutting blade 9 and when a sharpening tool is operated on the angular cutting edges said tool will engage the rollers and preclude engagement of the tool with the standard 4 thereby protecting the latter. Also, the rollers 25 serve to effect positioning of the tool S at a proper angle relative to the cutting edge 9 and thereby effect an even sharpening of the cutting edges.

From the foregoing it will be apparent that I have provided a simple and efficient appliance adapted to be readily attached and detached from cloth cutting machines whereby to serve as a guard for the standard thereof and to effect a proper sharpening of the knife.

It is to be distinctly understood that various changes and modifications in the construction and arrangement of the parts may be resorted to without departing from the spirit of the invention or scope of the appended claims.

What I claim is:

1. A device for facilitating the sharpening of the knife of a cloth cutting machine without dismounting said knife, comprising, an elongated channeled member adapted to embrace the standard of said machine and fashioned with pairs of upper and lower forwardly extending spaced arms adapted for connection with said machine, spring pressed means mounted on the upper end of said member and engaging said machine for effecting detachable connection of said member to said machine, spaced rollers rotatably mounted between said pairs of arms and adapted for lateral positioning in relation to ths knife of said machine and coacting with said knife to maintain a grinding tool spaced from said standard during the sharpening of said knife.

2. A device for facilitating the sharpening of the knife of a cloth cutting machine without dismounting said knife, comprising, an elongated channeled member adapted to embrace the standard of said machine and fashioned with pairs of upper and lower forwardly extending spaced arms adapted for connection with said machine, a spring pressed lever mounted on the upper end of said member and engaging the upper end of said standard of said machine for effecting detachable connection of said member to said machine, spaced rollers rotatably mounted between said pairs of arms and adapted for lateral positioning in relation to the knife of said machine and coacting with said knife to maintain a grinding tool spaced from said standard during the sharpening of said knife.

3. A device for facilitating the sharpening of the knife of a cloth cutting machine without dismounting said knife, comprising, a member adapted to embrace the standard of said machine, and spaced rollers rotatably carried by said member and adapted for lateral positioning in relation to said knife and coacting with the latter to engage a grinding tool and maintain said tool spaced from said standard during the sharpening of said knife by said tool.

FRANCISCO SIVILA SMITH.